(12) United States Patent
Dry (10) Patent No.: US 10,906,430 B2
(45) Date of Patent: Feb. 2, 2021

(54) DUAL ROLLER FOR A RAIL ASSEMBLY

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 16/272,177

(22) Filed: Feb. 11, 2019

(65) Prior Publication Data

US 2020/0254905 A1    Aug. 13, 2020

(51) Int. Cl.
*B60N 2/06*    (2006.01)
*B60N 2/07*    (2006.01)

(52) U.S. Cl.
CPC .............. *B60N 2/06* (2013.01); *B60N 2/062* (2013.01); *B60N 2/0715* (2013.01); *B60N 2/0722* (2013.01)

(58) Field of Classification Search
CPC ........ B60N 2/062; B60N 2/06; B60N 2/0722; B60N 2/0702; B60N 2/0715
USPC .................. 296/65.03, 65.13, 65.14
See application file for complete search history.

(56) References Cited

U.S. PATENT DOCUMENTS

| | | | |
|---|---|---|---|
| 5,911,465 A | 6/1999 | Yamamoto et al. | |
| 6,059,345 A * | 5/2000 | Yokota ................. | B60N 2/3011 248/430 |
| 6,145,911 A * | 11/2000 | Sturt ...................... | B60N 2/071 296/65.01 |
| 6,629,721 B1 | 10/2003 | Macey | |
| 7,441,822 B1 | 10/2008 | Day | |
| 7,708,331 B2 | 5/2010 | Yamasaki | |
| 7,775,718 B2 * | 8/2010 | Kohl .................... | B60N 2/0722 384/34 |
| 8,066,314 B2 * | 11/2011 | Tamura .................... | B60R 5/04 296/26.09 |
| 8,757,578 B2 * | 6/2014 | Kitamura ................ | B60N 2/07 248/430 |
| 2002/0036254 A1 * | 3/2002 | Eguchi .................... | B60N 2/075 248/429 |
| 2020/0171982 A1 * | 6/2020 | Dry ....................... | B60N 2/005 |
| 2020/0247278 A1 * | 8/2020 | Dry ....................... | B60N 2/0722 |

* cited by examiner

*Primary Examiner* — Jason S Morrow
(74) *Attorney, Agent, or Firm* — David Coppiellie; Price Heneveld LLP (57) ABSTRACT

A roller assembly for a vehicle seating assembly is provided. The roller assembly includes an anchor rotatably coupled with a vehicle seating support. An axle extends from the anchor. A first roller is positioned on the axle. A second roller is positioned on the axle and between the first roller and the anchor. A spacer is positioned on the axle and flush with the second roller.

20 Claims, 7 Drawing Sheets

DUAL ROLLER FOR A RAIL ASSEMBLY

FIELD OF THE DISCLOSURE

The present disclosure generally relates to a dual roller for a rail assembly, and more specifically to a single axis dual roller for a rail assembly for a vehicle seating assembly.

BACKGROUND OF THE DISCLOSURE

Vehicles are often provided with seating assemblies that can be adjusted for occupant comfort. Some seating assemblies in vehicles are capable of translation in fore-aft or side-to-side directions. In some seating assemblies, rollers may be used with rail assemblies to facilitate such translation of the seating assembly within the vehicle.

SUMMARY OF THE DISCLOSURE

According to one aspect of the present disclosure, a roller assembly for a vehicle seating assembly may be provided. The roller assembly may include an anchor rotatably coupled with a vehicle seating support. An axle may extend from the anchor. A first roller may be positioned on the axle. A second roller may be positioned on the axle. The second roller may be positioned between the first roller and the anchor. A spacer may be positioned on the axle and flush with the second roller.

Embodiments of this aspect of the disclosure may include any one or a combination of the following features:
- the spacer including a first spacer and a second spacer, wherein the second roller is positioned between the first and second spacers;
- the roller assembly further including a rail having a lower wall spaced apart from an upper wall, the lower wall including a step, wherein the rail defines a channel;
- the first roller positioned between the step of the lower wall and the upper wall, the first roller positioned substantially flush with the step of the lower wall; and/or
- the second roller positioned between the upper wall and the lower wall and substantially flush with the upper wall.

According to another aspect of the present disclosure, a roller assembly for a vehicle seating assembly may be provided. The roller assembly may include a rail having a lower wall spaced apart from an upper wall. An anchor may be rotatably coupled with a vehicle seating support. An axle may be positioned perpendicular to the anchor. A first roller may be positioned on the axle and may have a first diameter. A second roller may be positioned on the axle. The second roller may be positioned between the first roller and the anchor. The second roller may have a second diameter that may be greater than the first diameter.

Embodiments of this aspect of the disclosure may include any one or a combination of the following features:
- the lower wall and the upper wall defining a channel, the channel having a central portion and a lateral portion;
- the lower wall including a step, wherein a first distance between the step and the upper wall is greater than the first diameter of the first roller;
- a second distance between the lower wall and the upper wall being greater than the first distance between the step and the upper wall, wherein the second distance is greater than the second diameter of the second roller; and/or
- a first difference between the first distance and the first diameter defining a first space, wherein a second difference between the second distance and the second diameter defines a second space.

According to another aspect of the present disclosure, a roller assembly for a vehicle seating assembly may be provided. The roller assembly may include a rail having a lower wall spaced apart from an upper wall. The lower wall may include a step. An anchor may be rotatably coupled with said vehicle seating assembly. The anchor may be rotatable between an engaged position and a disengaged position. First and second opposing axles may be positioned perpendicular to and extending outward from the anchor. A first roller may be positioned on each of the first and second axles. The first roller may have a first diameter. A second roller may be positioned on each of the first and second axles. The second roller may have a second diameter. The second diameter may be greater than the first diameter. A first spacer may be positioned between the first roller and the second roller.

Embodiments of this aspect of the disclosure may include any one or a combination of the following features:
- the lower wall and the upper wall defining a channel, the channel having a central portion and a lateral portion, wherein the central portion is at least partially defined by the lower wall and the upper wall and the lateral portion is at least partially defined by the step of the lower wall and the upper wall;
- the first roller positioned within the lateral portion of the channel when the anchor is in the engaged position, the first roller configured to abut the step;
- the second roller positioned within the central portion of the channel, the second roller configured to abut the upper wall;
- the upper wall defining an opening, wherein the anchor is positioned within the opening;
- the opening having a width substantially equal to or greater than the second diameter of the second roller;
- the rail being one of a network of rails positioned within a vehicle;
- the anchor, the first and second axles, the first and second rollers, and the first spacer being removable from the rail when the anchor is in the disengaged position;
- the first and second axles being vertically aligned; and/or
- the roller assembly further including a second spacer positioned between the second roller and the anchor.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a roller assembly for a vehicle seating assembly where the roller assembly is a single axis assembly with dual rollers. The roller assembly includes at least one axle extending perpendicularly from an anchor and oriented along a single axis. The axle is received by first and second rollers spaced apart by spacers. The anchor, the axle, and the rollers are received within a rail. The rail includes an upper wall and a lower wall spaced apart and joined by sidewalls. The lower wall includes at least one step. The upper wall and the lower wall define a channel of the rail. The channel may include a central portion and a lateral portion. The lateral portion may be at least partially defined by the step of the lower wall and may have a height that is less than the height of the central portion. The first roller is positioned within the lateral portion and in contact with the step of the lower wall. Similarly, the second roller is positioned within the central portion and is in contact with the upper wall. The contact between the first and second rollers and the lower wall and the upper wall, respectively, allows the roller assembly to operate with reduced or eliminated rattle without requiring a secondary axle, as described in more detail elsewhere herein.

Referring now to FIGS. 1-7, reference number 10 generally designates a roller assembly for a vehicle seating assembly 20. The roller assembly 10 may include at least one rail 24 having a lower wall 28 spaced apart from an upper wall 30. The lower wall 28 may include a step 34. At least one anchor 38 may be rotatably coupled with the vehicle seating assembly 20. First and second opposing axles 42, 44 may be positioned perpendicular to and extending outward from each anchor 38. A first roller 48 may be positioned on each of the first and second axles 42, 44. The first roller 48 may have a first diameter D1. A second roller 50 may also be positioned on each of the first and second axles 42, 44. The second roller 50 may have a second diameter D2. The second diameter D2 may be greater than the first diameter D1. A spacer 54a, 54b may be positioned between the first roller 48 and the second roller 50. The spacer may be one of a first spacer 54a and a second spacer 54b.

Figure 1:
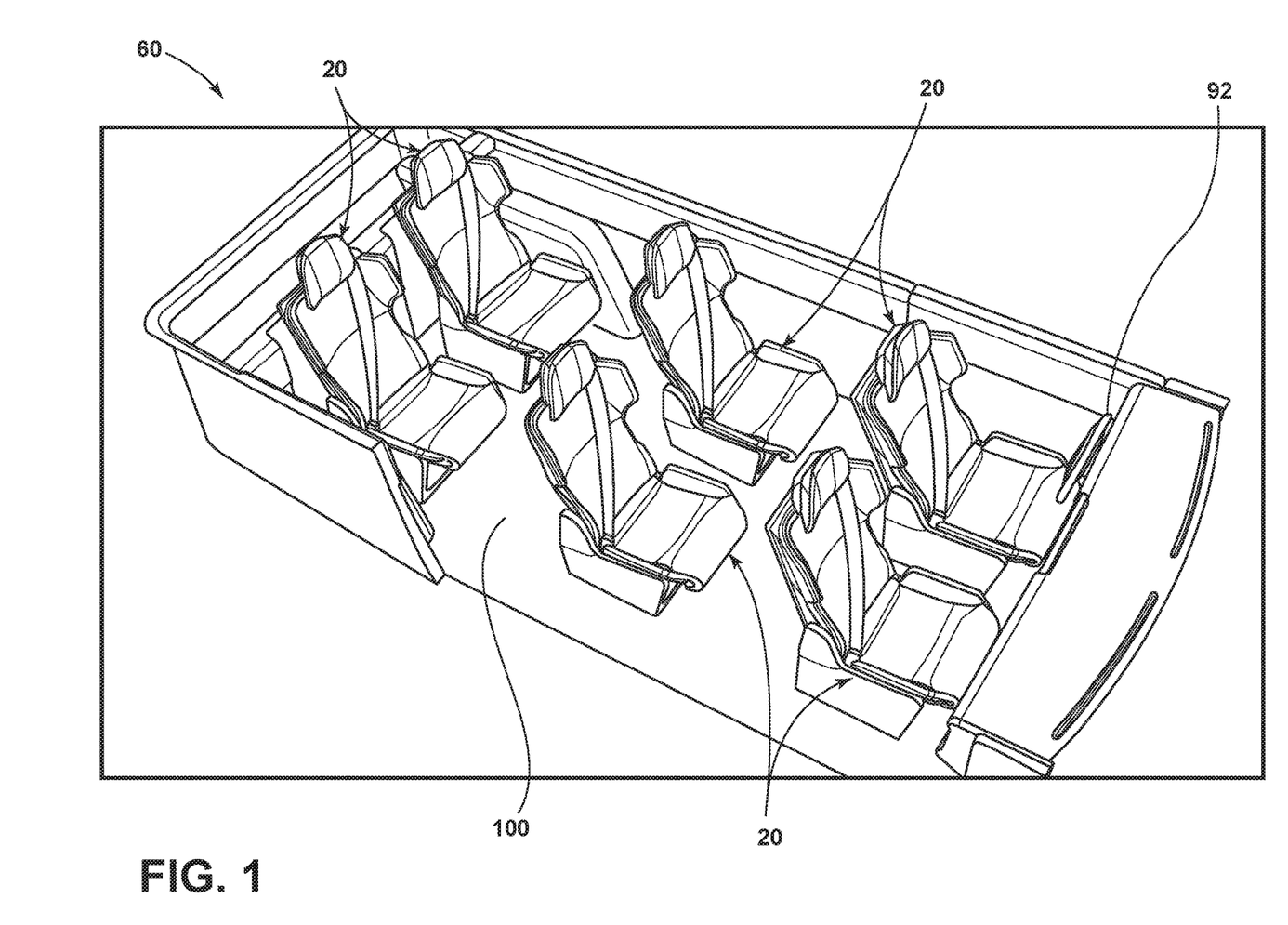
FIG. 1 is a side perspective view of an interior of a vehicle, illustrating first, second, and third rows of seating assemblies, according to various examples.
Figure 2:
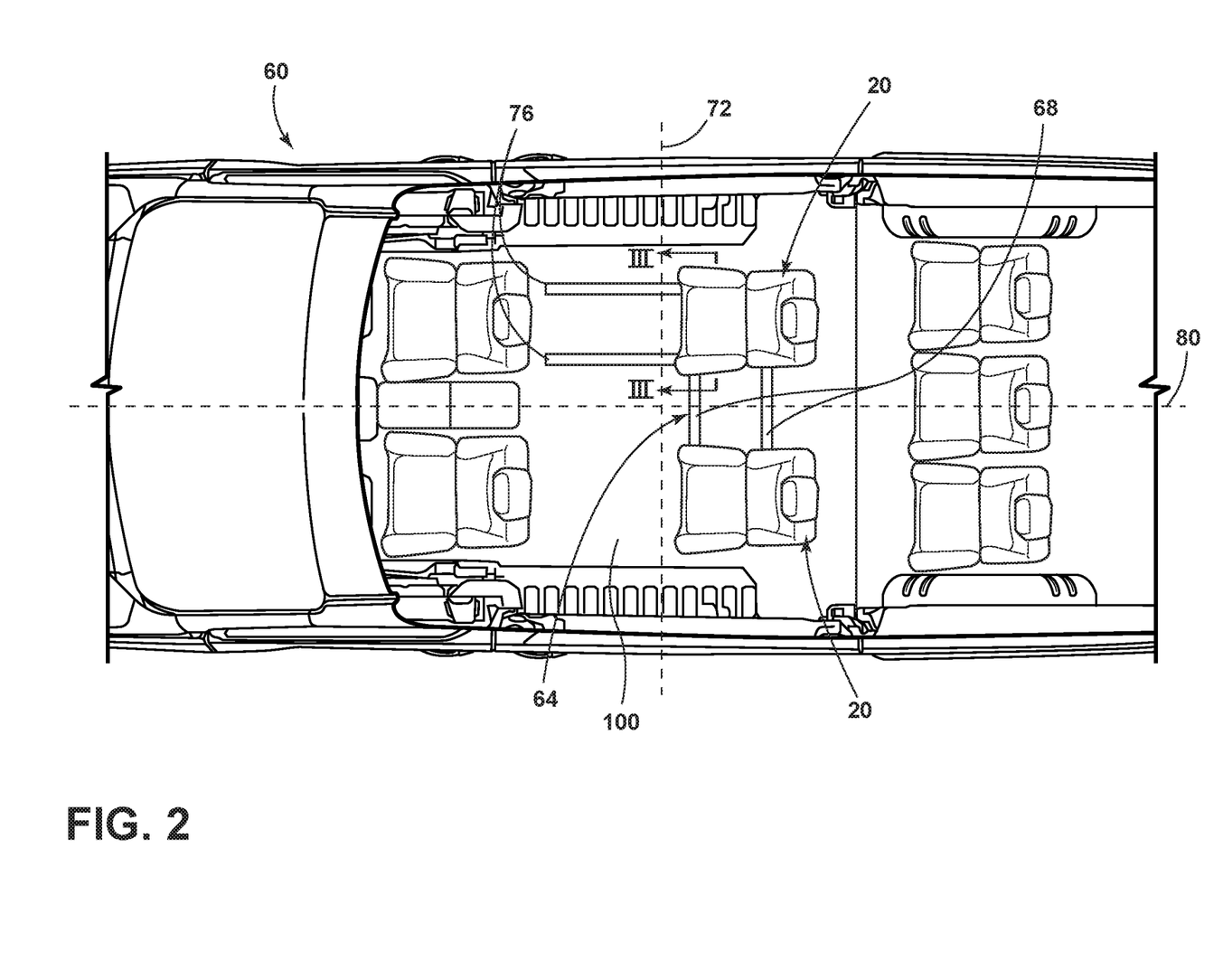
FIG. 2 is a top view of the interior of the vehicle of FIG. 1, illustrating a network of rails, according to various examples.

Referring to FIGS. 1 and 2, a vehicle is generally designated by numeral 60. The vehicle 60 may be passenger driven, semi-autonomous, fully autonomous, or any combination of user-controlled and automated. Accordingly, in some examples, the vehicle 60 may be provided with a steering wheel 92 that is positioned proximate to one of a plurality of seating assemblies 20.

A network of rails 64 for the vehicle 60 may be coupled with a floor 100 of the vehicle 60. The network of rails 64 may include lateral rails 68 that extend primarily along a lateral axis 72 of the vehicle 60. The network of rails 64 may also include longitudinal rails 76 that extend primarily along a longitudinal axis 80 of the vehicle 60. In the depicted examples of FIGS. 1 and 2, the lateral rails 68 and the longitudinal rails 76 are generally provided in pairs that include individual rails 24 that make up the network of rails 64.

Figure 3:
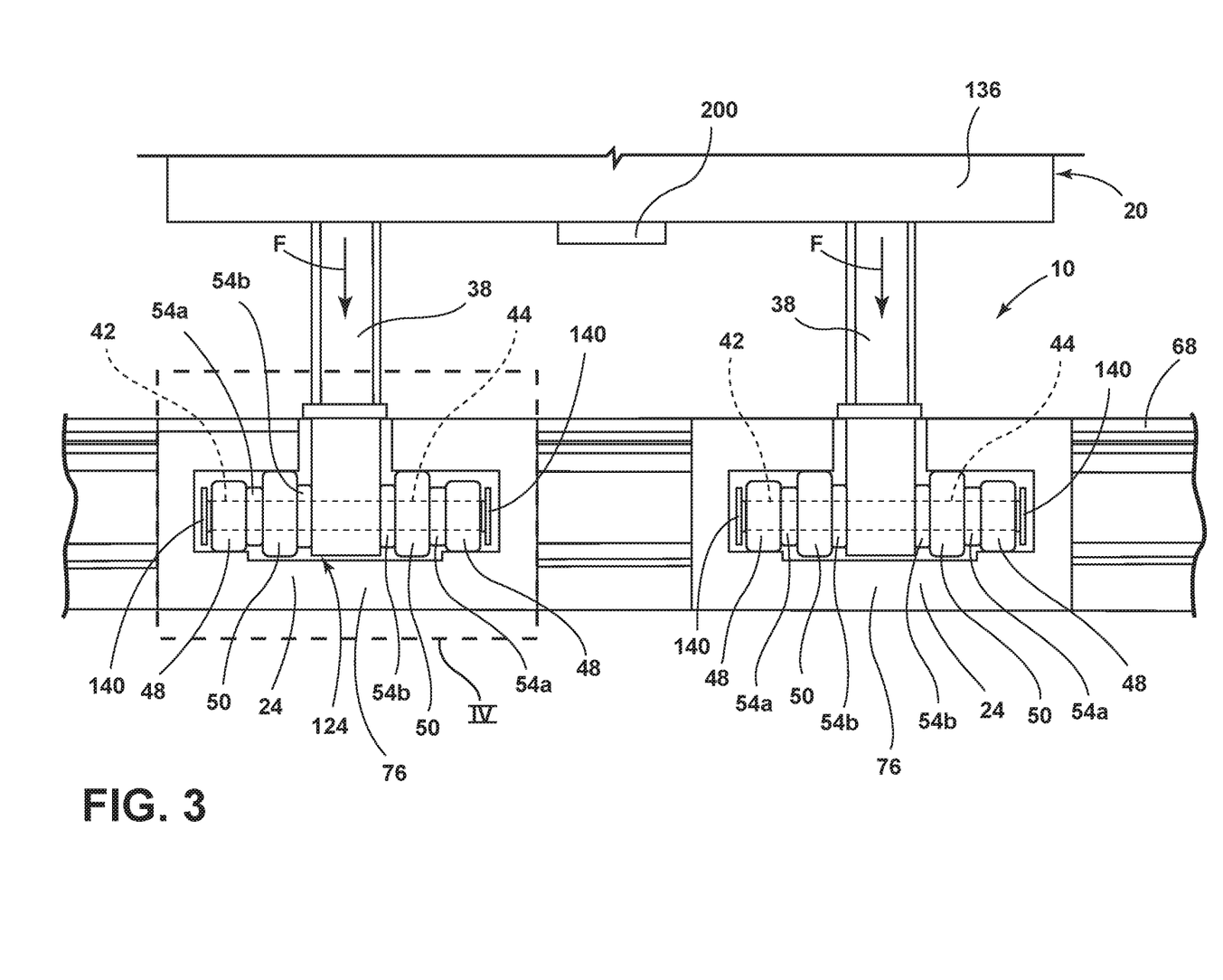
FIG. 3 is a cross-sectional view of the network of rails, taken at line of FIG. 2, according to various examples.

The seating assemblies 20 may be arranged in a number of configurations that may distribute the seating assemblies 20 at various locations within the vehicle 60. For example, the seating assemblies 20 may be distributed across a first row of seating assemblies, a second row of seating assemblies, and/or a third row of seating assemblies. In various examples, the seating assemblies 20 may be coupled to the network of rails 64 by a plurality of roller assemblies 10 (FIG. 3). The roller assemblies 10 may be configured to facilitate actuation of the seating assemblies 20 along the lateral rails 68 and the longitudinal rails 76.

In general, the lateral rails 68 and the longitudinal rails 76 are configured to have corresponding heights and thicknesses to enable smooth and seamless transfer of the seating assemblies 20 and their associated roller assemblies 10 throughout the extent of the network of rails 64 without resulting in binding or sticking of the rollers 48, 50 of the roller assembly 10 within the network of rails 64. The network of rails 64 may be positioned throughout the interior of the vehicle 60. In alternative examples, the network of rails 64 may be positioned in less than the entirety of the floor 100 of the vehicle 60. The network of rails 64 may be coupled with the floor 100 of the vehicle 60. Alternatively, the network of rails 64 may be integrally formed with the floor 100 of the vehicle 60.

Figure 4:
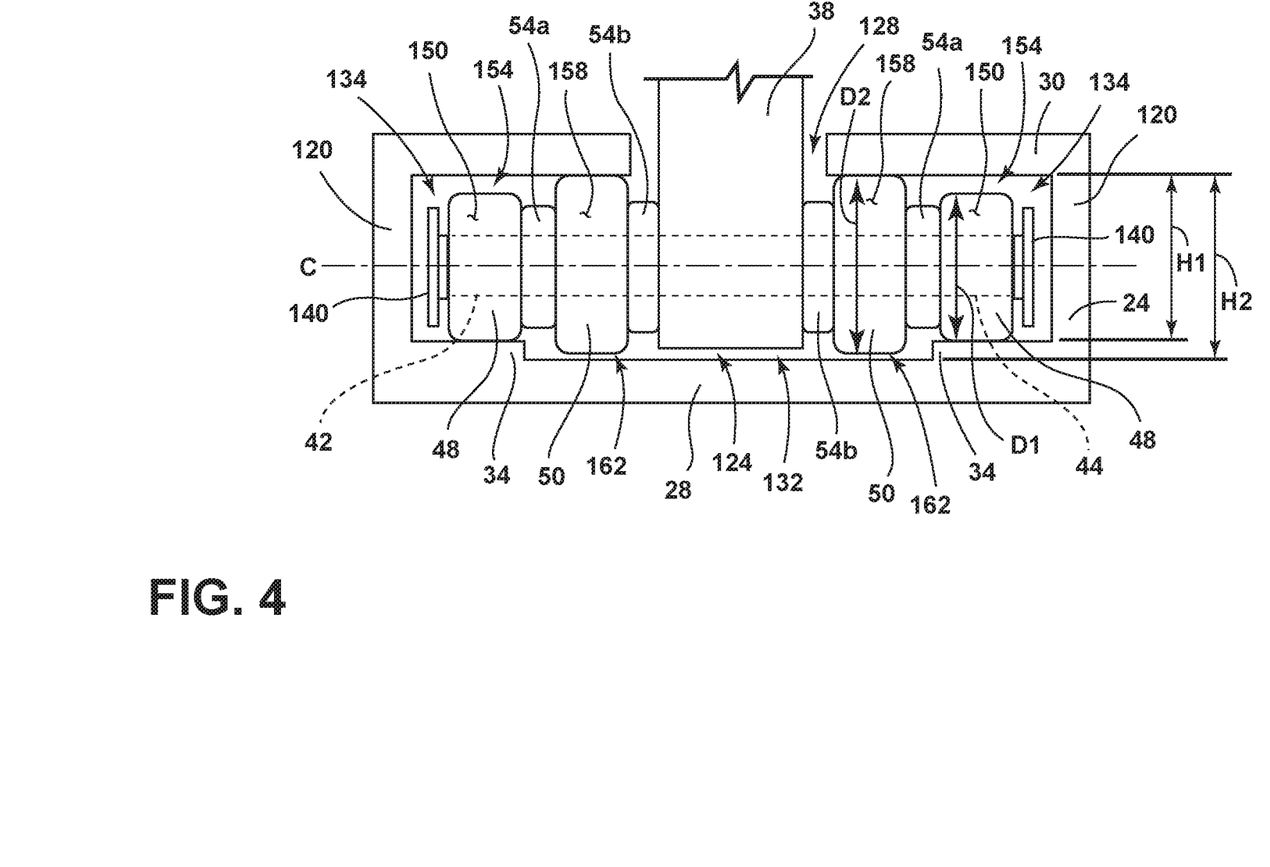
FIG. 4 is an enhanced view of an individual rail of the network of rails of FIG. 3.

Referring now to FIGS. 3 and 4, each of the lateral rails 68 and the longitudinal rails 76 of the network of rails 64 may be configured to act as the respective rails 24 of the roller assembly 10 for each vehicle seating assembly 20. In other words, the rail 24 may be one of the network of rails 64 positioned within the vehicle 60. Each rail 24 includes the lower wall 28 spaced apart from the upper wall 30. Each rail 24 may further include one or more sidewalls 120 extending between the lower wall 28 and the upper wall 30.

The lower wall 28, the upper wall 30, and the sidewalls 120 of the rail 24 define an elongated channel 124 extending along the length of the rail 24. The channel 124 may be configured to at least partially receive one or more of the anchors 38 and corresponding axles 42, 44 and rollers 48, 50 of the roller assembly 10. The upper wall 30 may further define an elongated opening 128 extending in tandem with the elongated channel 124 of the rail 24. The opening 128 may be in communication with the channel 124 such that the channel 124 is accessible via the opening 128. The elongated opening 128 may be sized to receive and guide one of the anchors 38 of the roller assembly 10.

As shown in FIGS. 3 and 4, the lower wall 28 may include steps 34. In various examples, the steps 34 may be spaced apart on either side of the rail 24. Each step 34 may be positioned proximate one of the sidewalls 120 of the rail 24. The steps 34 of the lower wall 28 may divide the channel 124 of the rail 24 to define a central portion 132 and at least one lateral portion 134. Each of the steps 34 and the upper wall 30 may at least partially define the respective lateral portions 134 of the channel 124. A top surface of the step 34 and an inner surface of the upper wall 30 may be spaced apart a first distance. The first distance may be a first height H1 of the channel 124. Similarly, between the steps 34, the lower wall 28 and the upper wall 30 may at least partially define the central portion 132. An inner surface of the lower wall 28 and the inner surface of the upper wall 30 may be spaced apart a second distance. The second distance may be a second height H2. The second height H2 may be greater than the first height H1. The lower wall 28 and the steps 34 may be positioned parallel with the upper wall 30, such that the heights H1, H2 may be substantially continuous across the length of the rail 24. In various examples, the heights of each lateral portion 134 of the channel 124 may be the same as the height of other lateral portions 134 of the channel 124 of the rail 24. In other examples, the heights of the lateral portions 134 of the channel 124 may differ.

Referring now to FIGS. 3-7, each seating assembly 20 may include one or more anchors 38 of the roller assembly 10. Each of the anchors 38 may be coupled to the seating assembly 20. According to various examples, the anchors 38 may be coupled with a vehicle seating support 136. In other examples, the anchors 38 may be coupled directly with the vehicle seating assembly 20. For example, the anchor 38 may be a carriage pillar. Each anchor 38 may extend downward from the seating assembly 20 and may be rotatably coupled with the seating assembly 20 and/or the vehicle seating support 136. The anchors 38 may be rotatable between an engaged position (FIGS. 3-5) and a disengaged position (FIGS. 6 and 7), as discussed in more detail elsewhere herein.

Figure 5:
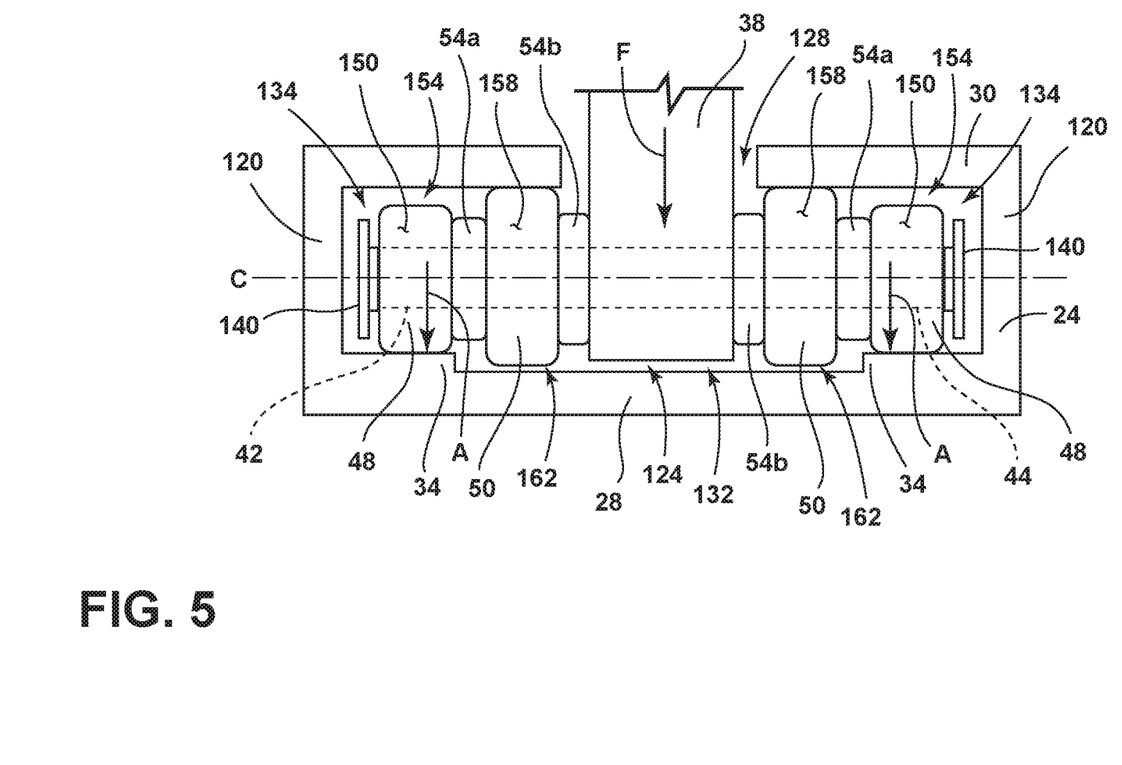
FIG. 5 is an enhanced view of an individual rail of the network of rails of FIG. 3 showing load distribution.

When the anchors 38 are in the engaged position, as shown in FIGS. 3-5, each anchor 38 may be positioned through the opening 128 of the respective rail 24, such that the axles 42, 44 and the corresponding rollers 48, 50 are positioned within the channel 124. The anchor 38 may be configured to extend through the opening 128 and into the central portion 132 of the channel 124. Each anchor 38 may have a generally circular cross-section. Alternatively, each anchor 38 may have a cross-sectional shape of an oval, triangle, square, rectangle, or any other higher order polygon. The seating assembly 20 may include any number of anchors 38 without departing from the scope of the present disclosure.

Referring now to FIG. 3, each of the anchors 38 may include respective first and second axles 42, 44 extending outward from opposing sides of the anchor 38. In various examples, the first and second axles 42, 44 may be individually coupled with the anchor 38. In other examples, the first and second axles 42, 44 may be integrally formed to be a single axle extending through the respective anchor 38. The single axle may include the first and second axles 42, 44 as ends protruding from opposing sides of the anchor 38. Each of the first and second axles 42, 44 may extend outward from and perpendicular to the anchor 38. The first and second axles 42, 44, independently or integrally formed, may be positioned on a single central axis C extending through the anchor 38. In other words, the first axle 42 may be vertically aligned with the second axle 44.

A first roller 48 may be positioned on each of the first and second axles 42, 44 proximate the end of the axle 42, 44. A second roller 50 may be positioned on each of the first and second axles 42, 44 and may be oriented between the first roller 48 and the anchor 38. The first and second rollers 48, 50 may be oriented such that the central axis C passes through a center of the cross-section of each roller 48, 50. The first spacer 54a may be positioned between the first roller 48 and the second roller 50. The second spacer 54b may be positioned on each of the first and second axles 42, 44 between the second roller 50 and the anchor 38. A stop 140 may be positioned on the end of each axle 42, 44. The stop 140 may be configured to retain the first roller 48, the second roller 50, and the first and second spacers 54a, 54b of the respective axle 42, 44.

As shown in FIG. 4, each of the first and second axles 42, 44 may be vertically oriented to extend into one of the lateral portions 134 of the channel 124 of the rail 24. Each of the first and second axles 42, 44 may be configured to position the first and second rollers 48, 50 within the respective lateral portion 134 of the channel 124. The axles 42, 44 may be fixedly coupled to the anchor 38 with the first and second rollers 48, 50 rotatable about the central axis C of the axles 42, 44, according to various examples. In other examples, the rollers 48, 50 may be fixedly coupled to the axles 42, 44 and the axles 42, 44 may be configured to rotate about the central axis C with the rollers 48, 50. Each of the first and second rollers 48, 50 may be formed of non-hard elastomeric material such as polyurethane, nylon, or ultra-high molecular weight (UHMW) plastic, for example. The rollers 48, 50 may be configured to roll along the rail 24 without slippage. When the first and second rollers 48, 50 are rolling, the first roller 48 may be configured to rotate in a first direction. The second roller 50 may be configured to rotate in a second direction. The second direction may be opposite the first direction.

Referring still to FIG. 4, the first roller 48 of each axle 42, 44 may be positioned between the respective step 34 of the lower wall 28 and the upper wall 30 and within the lateral portion 134 of the channel 124 of the rail 24 when the anchor 38 is in the engaged position. Each first roller 48 may include an outer surface 150. The outer surface 150 of the first roller 48 may be positioned substantially flush with the top surface of the step 34 of the lower wall 28 of the rail 24. Each first roller 48 may span the first diameter D1, as previously introduced. The first diameter D1 is less than the first height H1 of the lateral portion 134 of the channel 124 of the rail 24. Each first roller 48 may be positioned such that the outer surface 150 of the first roller 48 abuts the top surface of the respective step 34 of the rail 24. The resulting difference between the first diameter D1 of the first roller 48 and the first height H1 of the respective lateral portion 134 of the channel 124 defines a first space 154 between the outer surface 150 of the first roller 48 and the inner surface of the upper wall 30 of the rail 24. In other words, a first difference between the first distance H1 and the first diameter D1 defines the first space 154. The first space 154 may prevent skidding caused by friction between the first roller 48 and the rail 24.

The second roller 50 of each axle 42, 44 may be positioned proximate the anchor 38 and between the lower wall 28 and the upper wall 30 within the central portion 132 of the channel 124. Each second roller 50 may include an outer surface 158. The outer surface 158 of the second roller 50 may be positioned substantially flush with the inner surface of the upper wall 30 of the rail 24. Each second roller 50 may span the second diameter D2, as previously introduced. In various examples, the second diameter D2 may be greater than the first diameter D1 of the first roller 48. In other examples, the second diameter D2 may be equal to or less than the first diameter D1 of the first roller 48. The second diameter D2 may further be greater than the first height H1 of the lateral portions 134 of the channel 124. The second height H2 of the central portion 132 of the channel 124 of the rail 24 is greater than the second diameter D2 of the second roller 50.

Each second roller 50 may be positioned, such that the outer surface 158 of the second roller 50 abuts the inner surface of the upper wall 30 of the rail 24. The resulting difference between the second diameter D2 of the second roller 50 and the second height H2 of the central portion 132 of the channel 124 defines a second space 162 between the outer surface 158 of the second roller 50 and the inner surface of the lower wall 28. In other words, a second difference between the second distance H2 and the second diameter D2 defines the second space 162. The second space 162 may prevent skidding caused by friction between the second roller 50 and the rail 24.

In various examples, the diameters D1, D2 of the first and second rollers 48, 50 of the first axle 42 may differ from the diameters of the first and second rollers 48, 50 of the second axle 44. In other examples, the diameters D1, D2 of the first and second rollers 48, 50 may be consistent across the first and second axles 42, 44 of the anchor 38. In still other examples, the diameters D1, D2 of the first and second rollers 48, 50 of the first and second axles 42, 44 of one anchor 38 may differ from the diameters D1, D2 of the first and second rollers 48, 50 of the axles 42, 44 of another anchor 38 of the roller assembly 10.

Each first spacer 54a may be positioned on the respective axle 42, 44 between the second roller 50 and the anchor 38. The first spacer 54a is sized to position the second roller 50 within the channel 124 and away from the opening 128 to facilitate contact between the outer surface 158 of the second roller 50 and the inner surface of the upper wall 30. Each second spacer 54b may be positioned on the respective axle 42, 44 between the first roller 48 and the second roller 50. The second spacer 54b is sized to position the first roller 48 within the respective lateral portion 134, such that the outer surface 150 of the first roller 48 contacts the top surface of the respective step 34. Each of the spacers 54a, 54b may be substantially flush with one or more of the rollers 48, 50 and may be formed of a low friction material. In various examples, only one of the spacers 54a, 54b may be used. In other examples, additional spacers may be used in conjunction with the first and second spacers 54a, 54b.

Referring now to FIGS. 3 and 5, when the vehicle seating support 136 of the vehicle seating assembly 20 is loaded, a force F is applied to each anchor 38. The force F is directed downward through the anchor 38 toward the lower wall 28 of the rail 24. Each of the first rollers 48 may act to distribute the force F while the second rollers 50 may prevent inadvertent bouncing of the first rollers 48 by pressing up against the inner surface of the upper wall 30. When the force F is applied to each anchor 38, the respective first rollers 48 translate the force F, as shown by arrow A, onto the respective step 34 of the lower wall 28 of the rail 24. When the force F is released, the contact between the outer surface 158 of each second roller 50 and the inner surface of the upper wall 30 prevents the first rollers 48 from rebounding upward.

Figure 6:
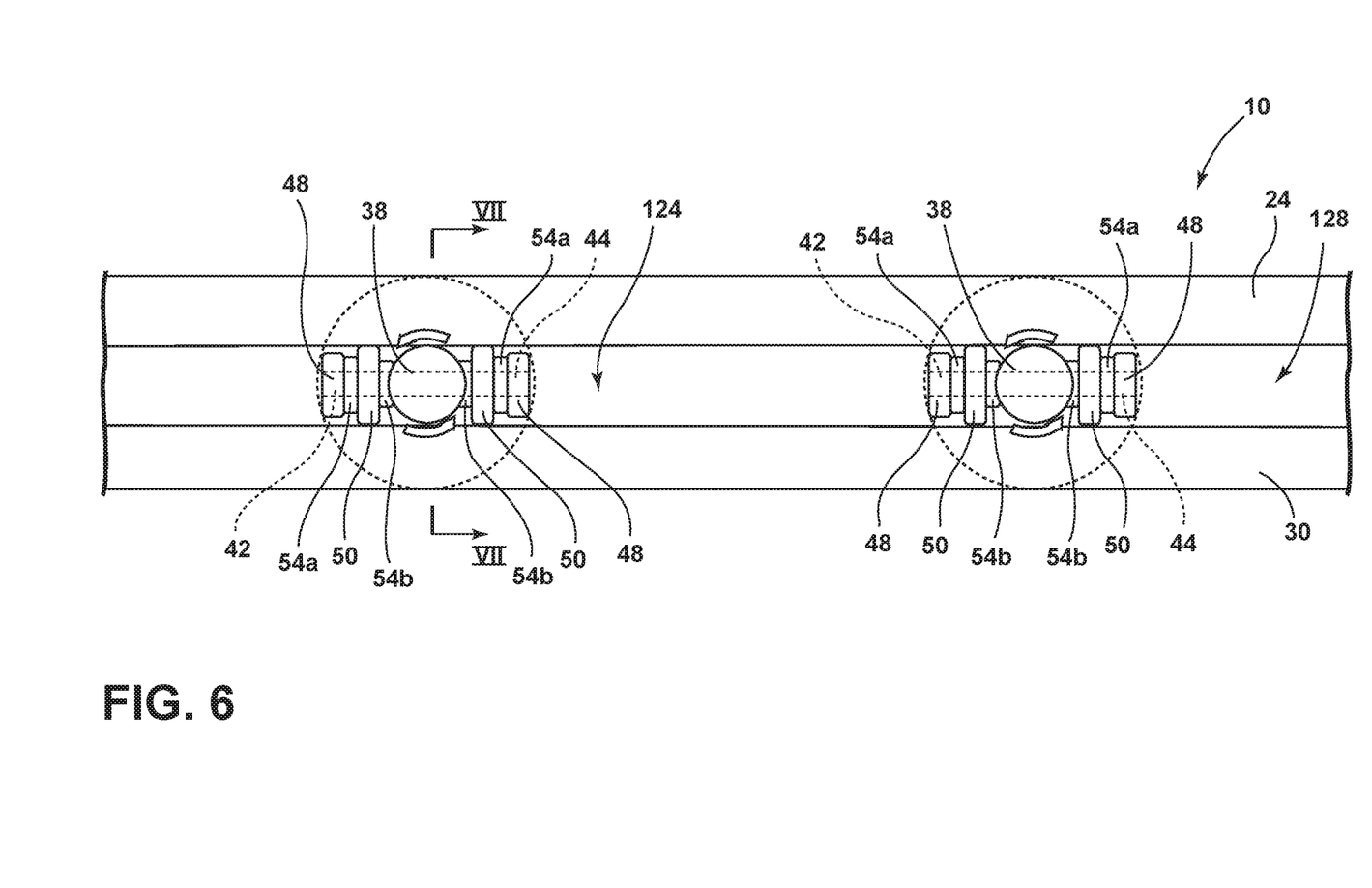
FIG. 6 is a top view of an individual rail of the network of rails of FIG. 2, illustrating engagement of anchors with the individual rail, according to various examples.
Figure 7:
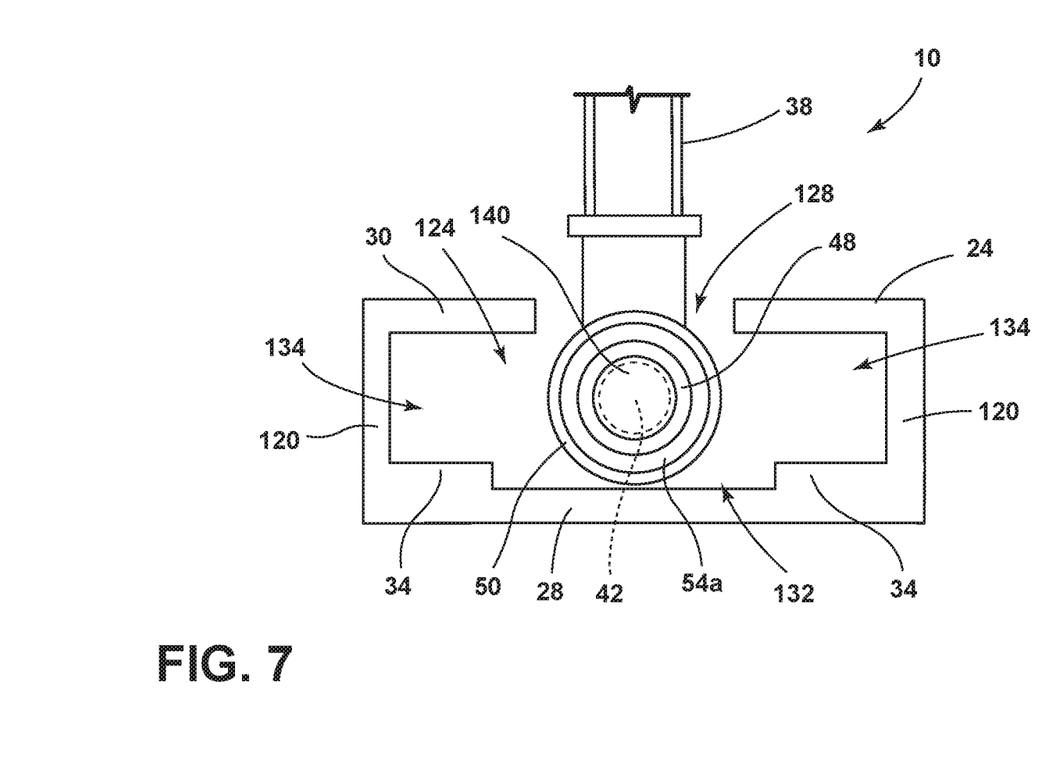
FIG. 7 is a cross-sectional view of one of the individual rails, taken along line VII-VII of FIG. 6, according to various examples.

As discussed elsewhere herein, the anchors 38 are rotatable between the engaged position (FIGS. 3-5) and the disengaged position (FIGS. 6 and 7). Referring now to FIGS. 6 and 7, the rotation of the anchor 38 may be utilized in engaging and disengaging the seating assemblies 20 from the network of rails 24. For example, when the anchors 38 are rotated into the disengaged position, the axles 42, 44 and the corresponding rollers 48, 50 and spacers 54a, 54b are configured to be coaxially aligned with the opening 128 of the upper wall 30 of the rail 24. When the anchor 38 is in the disengaged position, the rollers 48, 50 may be removed from the rail 24. In other words, the anchor 38, the first and second axles 42, 44, the first and second rollers 48, 50, and the first and second spacers 54a, 54b may be removed from the rail 24 when the anchor 38 is in the disengaged position. The opening 128 may be sized to accommodate removing the rollers 48, 50 from the rail 24. According to various examples, the opening 128 may have a width that is substantially equal to the diameter D2 of the second roller 50. In other examples, the opening 128 may have a width that is substantially greater than the diameter D2 of the second roller 50.

Referring now to FIGS. 1-7, each seating assembly 20 may be installed within the vehicle 60 by inserting the anchors 38 and the respective rollers 48, 50 through the opening 128 and rotating the respective anchor 38 about 90° in a first direction and into the engaged position. Similarly, the seating assembly 20 may be removed from the vehicle 60 by rotating the respective anchor 38 about 90° in a second direction where the second direction is opposite the first direction. The rotation in the second direction rotates the anchor 38 from the engaged position into the disengaged position. The anchors 38 of the roller assembly 10 may be configured to rotate separately. Alternatively, the anchors 38 of the roller assembly 10 may be configured to rotate as a whole group or various individual groups. In various examples, a locking mechanism 200 may be utilized to lock the anchors 38 in the engaged or disengaged position.

The single axis dual roller design of the roller assembly 10 provides the second rollers 50 as a second set of non-weight bearing rollers to press upwards against the rail 24 to accommodate for the first space 154 between the first rollers 48 and the inner surface of the upper wall 30 of the rail 24. The mass of the roller assembly 10 is reduced by providing both the first roller 48 and the second roller 50 on each of the first and second axles 42, 44. Each of the first rollers 48 and the second rollers 50 rotates freely of the other rollers 48, 50 while contacting only one surface of the rail 24. This reduces and may eliminate noise, vibration, and harshness (NVH), rattle, and looseness of the rollers 48, 50 within the individual rails 24 of the network of rails 64 of the vehicle 60. By using the single axis dual roller design, the roller assembly 10 is more compact than dual axis designs and may include fewer components, increasing the ease of manufacturing. The single axis design of the roller assembly 10 may further provide additional room between the anchors 38 to add other components of the seating assembly 20. For example, the locking mechanism 200, a center drive, or length compression may be positioned on the vehicle seating support 136 between the anchors 38.

It will be understood by one having ordinary skill in the art that construction of the described concepts, and other components, is not limited to any specific material. Other exemplary embodiments of the concepts disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A roller assembly for a vehicle seating assembly, comprising:
   an anchor rotatably coupled with a vehicle seating support;
   an axle extending from the anchor;
   a first roller positioned on the axle;
   a second roller positioned on the axle, the second roller positioned between the first roller and the anchor; and
   a spacer positioned on the axle and flush with the second roller.

2. The roller assembly of claim 1, wherein the spacer includes a first spacer and a second spacer, and further wherein the second roller is positioned between the first and second spacers.

3. The roller assembly of claim 1, further comprising:
   a rail having a lower wall spaced apart from an upper wall, the lower wall including a step, wherein the rail defines a channel.

4. The roller assembly of claim 3, wherein the first roller is positioned between the step of the lower wall and the upper wall, the first roller positioned substantially flush with the step of the lower wall.

5. The roller assembly of claim 3, wherein the second roller is positioned between the upper wall and the lower wall and substantially flush with the upper wall.

6. A roller assembly for a vehicle seating assembly, comprising:
   a rail having a lower wall spaced apart from an upper wall;
   an anchor rotatably coupled with a vehicle seating support;
   an axle positioned perpendicular to the anchor;
   a first roller positioned on the axle and having a first diameter; and
   a second roller positioned on the axle and between the first roller and the anchor, wherein the second roller has a second diameter that is greater than the first diameter.

7. The roller assembly of claim 6, wherein the lower wall and the upper wall define a channel, the channel having a central portion and a lateral portion.

8. The roller assembly of claim 7, wherein the lower wall includes a step, and further wherein a first distance between the step and the upper wall is greater than the first diameter of the first roller.

9. The roller assembly of claim 8, wherein a second distance between the lower wall and the upper wall is greater than the first distance between the step and the upper wall, and further wherein the second distance is greater than the second diameter of the second roller.

10. The roller assembly of claim 9, wherein a first difference between the first distance and the first diameter defines a first space, and further wherein a second difference between the second distance and the second diameter defines a second space.

11. A roller assembly for a vehicle seating assembly, comprising:

a rail having a lower wall spaced apart from an upper wall, the lower wall including a step;

an anchor rotatably coupled with said vehicle seating assembly, the anchor rotatable between an engaged position and a disengaged position;

first and second opposing axles positioned perpendicular to and extending outward from the anchor;

a first roller positioned on each of the first and second axles, the first roller having a first diameter;

a second roller positioned on each of the first and second axles, wherein the second roller has a second diameter, the second diameter greater than the first diameter; and a first spacer positioned between the first roller and the second roller.

12. The roller assembly of claim 11, wherein the lower wall and the upper wall define a channel, the channel having a central portion and a lateral portion, and further wherein the central portion is at least partially defined by the lower wall and the upper wall and the lateral portion is at least partially defined by the step of the lower wall and the upper wall.

13. The roller assembly of claim 12, wherein the first roller is positioned within the lateral portion of the channel when the anchor is in the engaged position, the first roller configured to abut the step.

14. The roller assembly of claim 12, wherein the second roller is positioned within the central portion of the channel, the second roller configured to abut the upper wall.

15. The roller assembly of claim 11, wherein the upper wall defines an opening, and further wherein the anchor is positioned within the opening.

16. The roller assembly of claim 15, wherein the opening has a width substantially equal to or greater than the second diameter of the second roller.

17. The roller assembly of claim 11, wherein the rail is one of a network of rails positioned within a vehicle.

18. The roller assembly of claim 11, wherein the anchor, the first and second axles, the first and second rollers, and the first spacer are removable from the rail when the anchor is in the disengaged position.

19. The roller assembly of claim 11, wherein the first and second axles are vertically aligned.

20. The roller assembly of claim 11 further comprising:

a second spacer positioned between the second roller and the anchor.

* * * * *